(12) United States Patent
Miyakawa et al.

(10) Patent No.: US 7,070,862 B1
(45) Date of Patent: Jul. 4, 2006

(54) RESIN-BOND TYPE OPTICAL ELEMENT, PRODUCTION METHOD THEREFOR AND OPTICAL ARTICLE

(75) Inventors: Akiko Miyakawa, Sagamihara (JP); Toru Nakamura, Kawasaki (JP); Masahito Suzuki, Kawasaki (JP)

(73) Assignee: Nikon Corporation, Tokyo (JP)

( * ) Notice: Subject to any disclaimer, the term of this patent is extended or adjusted under 35 U.S.C. 154(b) by 253 days.

(21) Appl. No.: 10/031,602

(22) PCT Filed: Jul. 24, 2000

(86) PCT No.: PCT/JP00/04922

§ 371 (c)(1),
(2), (4) Date: Jan. 23, 2002

(87) PCT Pub. No.: WO01/07938

PCT Pub. Date: Feb. 1, 2001

(30) Foreign Application Priority Data

Jul. 23, 1999 (JP) .................................. 11-209345
Sep. 27, 1999 (JP) .................................. 11-271738

(51) Int. Cl.
*B32B 27/40* (2006.01)

(52) U.S. Cl. ..................................... 428/425.6; 428/442

(58) Field of Classification Search ............. 428/423.1, 428/425.6, 442
See application file for complete search history.

(56) References Cited

U.S. PATENT DOCUMENTS

| 4,306,780 | A | * | 12/1981 | Tarumi et al. | ............... | 351/159 |
| 5,329,402 | A | * | 7/1994 | Sato | ........................... | 359/691 |
| 5,932,626 | A | * | 8/1999 | Fong et al. | ................. | 522/182 |
| 6,630,242 | B1 | * | 10/2003 | Lin et al. | ..................... | 428/378 |

FOREIGN PATENT DOCUMENTS

| JP | 62-258401 | * | 11/1987 |
| JP | 63-047702 | | 2/1988 |

OTHER PUBLICATIONS

Nagayama Norimitsu, Patent Abstracts of Japan, Device for Producing Composite Optical Element, No. 04-149041, May 22, 1992.

(Continued)

*Primary Examiner*—Melanie Bissett (57) ABSTRACT

This invention provides a resin-cemented optical element comprising a base member and a resin layer formed on the surface of the base member and comprising a cured product of a photosensitive resin composition, and the resin layer has (1) a refractive index of 1.55 or more, (2) a visible-light inner transmittance of 95% or more in a 100 μm thick area, (3) a rate of hygroscopic dimensional change of 0.4% or less, (4) a durometer hardness of HDD 70 or more, (5) a gel percentage of 95% or more, (6) a glass transition temperature of 95° C. or above or (7) a rate of shrinkage on curing of 7% or less; and a production process for the element and an optical article having the element.

5 Claims, 2 Drawing Sheets

OTHER PUBLICATIONS

Hijino Masamichi, Patent Abstracts of Japan, "Composite Type Optical Part",No. 04-294302, Oct. 19, 1992.

Mizuno Hitoshi, et al., Patent Abstracts of Japan, Optical Resin Composition and Optical Resin, No. 08-169918, Jul. 2, 1996.

Teramoto Satoshi, Patent Abstracts of Japan, Manufacture of Composite Type Optical Element, No. 10-309726, Nov. 24, 1998.

Tomono Haruo, et al., Patent Abstracts of Japan, Aspherical Lens, No. 62-258401, Nov. 10, 1987.

Tomono Haruo, Patent Abstracts of Japan, Production of Optical Element, No. 63-047702, Feb. 29, 1988.

English Language Translation of International Preliminary Examination Report for International Patent Application No. PCT/JP00/04922 (4 Pages) issued May 28, 2002.

* cited by examiner

RESIN-BOND TYPE OPTICAL ELEMENT, PRODUCTION METHOD THEREFOR AND OPTICAL ARTICLE

TECHNICAL FIELD

This invention relates to a resin-cemented optical element having a resin layer formed on the surface of a base member, a process for its production, and an optical article having the element.

BACKGROUND ART

At present, optical elements are used in various fields. Depending on the purpose for which they are used, it is difficult to materialize required optical characteristics and so forth in some cases in respect of conventional spherical lenses comprised only of glass. Accordingly, resin-cemented optical elements comprising a base member provided thereon with a cured resin layer having a stated shape are attracting notice.

For example, in order to make optical elements such as camera lenses compact and light-weight, it is important to lessen the number of component lenses of an optical system. In order to lessen the number of component lenses, it is effective that a component part constituted of a plurality of spheric lenses is replaced with one aspheric lens.

"Aspheric lens" is a generic term for lenses the curvature of which is kept continuously different over the region extending from the lens center toward the periphery. The use of aspheric lenses at some part of optical systems enables considerable reduction of the number of lenses necessary for the correction of aberrations, compared with a case in which the optical system is constituted only of spheric lenses. This can make the optical system compact and light-weight. Also, the use of aspheric lenses enables high-grade correction of aberrations which is difficult for spherical lenses, and hence can bring about an improvement in image quality.

Aspheric lenses having such superior characteristics have not necessarily come into wide use. The greatest reason therefor can be said to be a difficulty in working. Conventional aspheric lenses make use of base members made of glass, and have only be able to be produced by precisely polishing this glass, having involved the problem of a high cost.

In recent years, however, techniques for producing resin-cemented optical elements such as composite-type aspherical-surface molding, plastic molding, and glass molding have been put into practical use one after another, and it has become possible to produce aspheric lenses at a low cost by these methods. Thus, the aspheric lenses have rapidly come into wide use. Nowadays, such aspheric lenses have come into wide use in camera lenses and so forth.

The plastic molding is a method in which a resin is injected into a mold with the desired aspherical shape to effect molding. This method can enjoy a high productivity and a low cost. It, however, has had problems that aspheric lenses thus produced have a limit to their refractive index and moreover are inferior to glass lenses in respect of figure tolerance and reliability.

The glass molding is a method in which a glass blank material standing softened is shaped in a mold having the desired aspherical shape. This method enables achievement of mass productivity and high precision. It, however, has a limit to the types of glass usable therefor. Moreover, it requires a relatively high molding temperature, and may impose a great load on the mold. Accordingly, how this load be reduced comes into question.

The composite-type aspherical-surface molding is a method in which, using a mold having an aspherical shape, a resin layer having the aspherical shape is provided on a spheric or aspheric glass lens. This method can be said to be a method having both the characteristics, i.e., the reliability the glass lens has and the mass productivity the plastic molding has. In the present specification, a lens produced by this composite-type aspherical-surface molding is called a PAG lens. Conventional PAG lenses have characteristic features that they can well be mass-produced and are relatively inexpensive. They, however, have problems such that, compared with aspheric lenses made of glass, they have a restriction on the extent of designable aspheric surface, have a low light transmittance, and may change in optical performance depending on environment, resulting in a poor reliability.

As the resin used in this composite-type aspherical-surface molding, it may include thermoplastic resins and photosensitive resins. In the case when aspheric lenses are produced, a method is especially effective in which a composition of photosensitive resin (photo-reactive resin) is made to adhere to the surface of a base member, followed by irradiation with light such as ultraviolet light to effect curing. However, when such a photosensitive resin is used in the PAG lens resin layer, there is a problem that the shape of the mold can not exactly be transferred especially in the case of a PAG lens having a large extent of aspherical surface, i.e., having a large resin thickness. This imposes a restriction on designing.

Conventional PAG lenses also have a lower light transmittance than glass lenses, and hence the employment of such PAG lenses may possibly lead to a low transmittance of the whole optical system. For this reason, the number of PAG lenses usable in one optical system is usually limited to one or two.

Resin-cemented optical elements such as the PAG lenses also have a problem that they may so greatly change in optical performance depending on environment as to have a poor weatherability. In order to improve the weatherability, it is effective to enhance the degree of cure (degree of polymerization) of the resin, and, in order to do so, it is effective to irradiate the resin by a large amount of light so as to cure the resin further. However, an increase in irradiation level results in a decrease in light transmittance of the resin because of its yellowing. Thus, it is difficult for any conventional techniques to achieve both the improvement in light transmittance and the improvement in weatherability of the resin-cemented optical element.

DISCLOSURE OF THE INVENTION

An object of the present invention is to provide a superior resin-cemented optical element having solved the above problems in conventional PAG lenses, i.e. the problems on the restrictions on optical performance and extent of designable aspherical surface, the weatherability and so forth, and having a high light transmittance (in particular, visible-light inner transmittance).

With regard to the aspheric lens having a large extent of aspherical surface, which has hitherto had insufficient optical performance in respect of, e.g., transmittance and been moldable with difficulty and producible only by costly methods, the present inventors have made extensive studies from various points of view in order to produce such an aspheric lens with ease and also to achieve superior optical performance by the use of the aspheric lens, and have discovered the following facts.

1. Characteristics of resin layer:

As a method by which a resin is molded with greater ease than conventional methods without damaging any optical performance having ever been achieved, a method is available in which the resin is made to have a higher refractive index. Namely, by the use of a resin having a higher refractive index, the same effect of aspherical surface as that achievable by the one having a large extent of aspherical surface can be achieved in a smaller extent of aspherical surface. Also, the lens having a small extent of aspherical surface is obtainable in a better moldability than the lens having a large extent of aspherical surface. Thus, it follows that the moldability can be improved by making the refractive index higher. More specifically, in order to make the effect of aspherical surface higher without changing the shape of aspherical surface, it is effective to make the resin have a higher refractive index. In particular, a resin having a refractive index of 1.55 or more enables the aspherical surface to be designed at a higher freedom, so that an aspheric lens usable for various purposes can be obtained.

Resins used in resin layers of conventional PAG lenses have had a refractive index of about 1.50 on the whole. However, the use of the resin having a refractive index of 1.55 or more enables the resin layer to have a layer thickness thinner than that in conventional cases. This not only makes the moldability higher, but also allows the resin to be used in a small quantity, enabling achievement of cost reduction.

It has also been ascertained that making the resin have a larger refractive index makes the PAG lens have a higher transmittance. This is because the difference in refractive index between the resin constituting the PAG lens and the glass can be made small, so that the light may less reflect at their interface. Hence, the use of the resin having a high refractive index makes it possible to use the PAG lens even in an aspheric lens required to have a higher transmittance. Such a PAG lens having a high transmittance contributes to the improvement of transmittance of the whole optical system and to the prevention of flares.

What is most questioned in optical performance of resin is the transmittance. In general, resin has lower transmittance than glass, and hence PAG lenses often have a transmittance inferior to the transmittance of aspheric lenses made only of glass. The transmittance of resin may lower on account of two factors, the scattering and absorption of light in the interior of the resin. The scattering is caused when the resin does not have any uniform compositional distribution to have refractive-index distribution at some part, by minute bubbles formed in the resin, or by any dot-like defects at the surface. As for the absorption, it arises from the molecular structure itself of a resin-constituting substance in some cases, but commonly in many cases it is absorption due to impurities included in the course of synthesis of the resin and a polymerization inhibitor previously added to the resin, or it is absorption due to a photopolymerization initiator and a reaction product thereof, or it is caused by any excess irradiation at the time of curing.

Accordingly, in order to improve light transmittance, it is important to remove impurities by purification as far as possible, taking account of the resin's molecular structure carefully. In addition, it is effective that a composition having a polymerization inhibitor and a photopolymerization initiator in an optimum state is polymerized under proper conditions for the irradiation.

In consideration of the foregoing, the resin layer may have an inner transmittance of 95% or more in a 100 μm thick area, where a PAG lens having optical characteristics good for practical use can be obtained.

In the step of transferring the shape of aspherical surface of a mold by the use of a photosensitive resin, the resin surface may peel from the mold during the irradiation. Such a problem may often occur. It has been ascertained that this relates closely to the rate of shrinkage on curing of resin. The fact that the shape of the mold can not exactly be transferred when a photosensitive resin is used is due to the shrinkage on curing when the resin cures. This shrinkage has a remarkable influence in the case of a PAG lens having a great difference in the extent of aspherical surface or the resin layer thickness. Here, the rate of shrinkage on curing is the value that depends substantially on the composition of the resin, and is an important property which determines the moldability of resin in the molding for PAG lenses.

Resin layers of PAG lenses have a difference of hundreds of micrometers or more between the maximum layer thickness and the minimum layer thickness. This difference in layer thickness of resin layers has a tendency of becoming larger and larger with a spread of the use of aspheric lenses hereafter. When a resin layer having such a complicated shape is irradiated by light, a stress is produced upon any abrupt shrinkage on curing to cause a difficulty that the shape of the mold is not exactly transferred. The rate of shrinkage on curing can readily be determined by measuring the specific gravity of the resin before and after its curing. More specifically, where the specific gravity before curing is represented by a, and the specific gravity after curing by b, the rate of shrinkage on curing can be calculated according to $$\{(b-a)/b\} \times 100 \ (\%).$$

Accordingly, resins having different rates of shrinkage on curing have been compared and studied to examine in detail the relationship between the rate of shrinkage on curing and the frequency of occurrence of faulty shape transfer for each resin. As the result, it has been ascertained that a resin having a rate of shrinkage on curing of 7% or less can be molded after the shape of aspherical surface without any problem. The use of such a resin enables production of aspheric lenses in a better moldability and in a superior production efficiency.

In order to control the rate of shrinkage on curing of the resin in this way, it is effective not to make up the resin from monomers, but to add also an oligomer having a relatively large molecular weight so that the number of functional groups per unit weight can be made small.

It has also been found that the problem of weatherability correlates with the rate of moisture absorption of resin. Resin commonly has a higher rate of moisture absorption and also a lower heat resistance than glass, and hence the former is inferior to the latter in respect or the weatherability. Accordingly, the optical performance of PAG lenses has been followed up throughout a year to reveal that it varies seasonably. It has been ascertained that this is caused by the moisture absorption of resin according to changes in moisture in environment. In an environment of high humidity, the resin absorbs moisture to cause a volumetric change, so that the optical performance may deteriorate.

Accordingly, resins having different rates of moisture absorption have been compared and studied to determine resin characteristics which are tolerable in practical use. As the result, it has been discovered that the problem on the changes in humidity can be solved when the rate of hygroscopic change in layer thickness is controlled to be 0.4% or less. This enables production of an aspheric lens having a durability strong enough to be usable even in service environment which changes greatly. Also, in order to make the resin have a low rate of moisture absorption, it is effective to lower the content of hydrophilic groups such as alkyleneoxy and isocyanate groups in the molecule.

As a result of evaluation on the weatherability of various resins, it has also been found that the resin layer may have a greatly poor weatherability when the resin has a low degree of polymerization, and must be cured at a high rate in order to achieve superior weatherability. Accordingly, as an index of the degree of polymerization, gel percentage has been measured which is determined from the weight ratio of dissolved things of cured resin having been treated with a solvent under stated conditions. As the result, it has been ascertained that a weatherability having no problem in practical use can be achieved when this gel percentage is 95% or more, and particularly preferably 96% or more.

The gel percentage is determined from a change in weight observed when the component having dissolved in the solvent under stated conditions is removed. Stated in detail, it is measured under the following conditions.

That is, about 0.5 g of a resin cured product is dried in a desiccator for about a day, and thereafter the mass of the dried resin obtained is precisely measured. Next, this resin is immersed in 70° C. methyl ethyl ketone for 6 hours. Here, the methyl ethyl ketone is changed for new one at intervals of 2 hours. The resin having been immersed for 6 hours is heated at 100° C. for 2 hours, and then left in the desiccator for a day to make it dry. Thereafter, the mass of the resin thus dried is precisely measured. Here, where the mass of the initial resin is represented by c, and the mass after immersion in methyl ethyl ketone by d, the gel percentage is calculated according to (d/c)×100 (%).

The cause of deterioration of the weatherability of resin is that unreacted functional groups remain also after the molding. Such unreacted functional groups may cause various side reaction over a long period of time to cause the coloring of resin. In this regard, the resin having a high gel percentage has less unreacted functional groups. Hence, such a resin is considered to have superior weatherability. In actual use, in order to provide a sufficient weatherability, it is preferable for the resin to have the gel percentage of 95% or more as stated above. In order to make the gel percentage higher, it is effective to optimize the amount of a photopolymerization initiator to be added and the level of irradiation.

There has been an additional problem that conventional resins for PAG lenses have a lower mar resistance than aspheric lenses made of glass, and tend to be marred when handled in, e.g., the step of assembling lenses. It has been discovered that the use of a resin having a durometer hardness of HDD 70 or more makes the resin not become marred in usual handling. The use of such a resin enables production of an aspheric lens having superior mar resistance to make it possible to obtain an aspheric lens durable to its use in service environment which tends to cause mars. This broadens the scope in which the aspheric lens is applicable. Also, in order to make the resin have such a higher hardness, it is important that the amount of a photopolymerization initiator to be added and the conditions for irradiation are optimized to cure the resin sufficiently. It is also effective to add to components a resin having a hard skeleton such as bisphenol-A skeleton.

The surfaces of resin layers of PAG lenses are usually provided with anti-reflection coat. Such a anti-reflection coat is formed by vacuum deposition or the like. If the resin has a low heat resistance, the resin may expand when heated by radiation heat at the time of this film formation, so that a coat layer harder than the resin can not follow up the latter's changes in shape to make the anti-reflection coat have cracks in some cases. Thus, the resin used in PAG lenses is required to have properties not causative of any changes even at high temperature.

Accordingly, in respect of some resins having different glass transition points, how the resins cause cracks has been compared and studied. As the result, it has been ascertained that a resin having a glass transition temperature of 95° C. or above can keep cracks from occurring. Thus, the use of the resin having such a property enables production of an aspheric lens having various durabilities and, in addition thereto, having superior reflection preventive performance and durable to more various service environments. In order to make the glass transition temperature higher, it is effective to use a polyfunctional (meth)acrylate or a polyfunctional urethane (meth)acrylate as a component of the resin. Here, the glass transition temperature can be determined as the point of inflection of a curve showing dimensional changes caused by heating, using TMA (thermomechanical analysis), a type of thermal analysis.

On the basis of the new findings explained above, the present invention provides an optical element comprising a base member and a resin layer formed on the surface of the base member and comprising a cured product of a photosensitive resin composition. The resin layer is a resin layer having at least one characteristic features of the following (1) to (7). The present invention also provides an optical lens comprising this aspheric lens, and provides an optical article having the optical lens.

Incidentally, the resin layer in the aspheric lens of the present invention may preferably have at least two of any of these characteristic features.

(1) It has a refractive index of 1.55 or more.
(2) It has a visible-light inner transmittance of 95% or more in a 100 µm thick area.
(3) It has a rate of hygroscopic dimensional change of 0.4% or less.
(4) It has a durometer hardness of HDD 70 or more.
(5) It has a gel percentage of 95% or more.
(6) It has a glass transition temperature of 95° C. or above.
(7) It has a rate of shrinkage on curing of 7% or less (i.e., it is a cured product of a resin composition having a rate of shrinkage on curing of 7% or less.

In the case when the optical element of the present invention is an aspheric lens, the shape of aspherical surface may be formed on the side of convex surface, or may be formed on the side of concave surface. In other words, the resin layer may be formed on either of concave and convex sides of a base member lens.

2. Resin Composition:

Accordingly, studies have been made on resins preferable for satisfying the above characteristics. As the result, what is preferable as the resin layer in the optical element of the present invention has been found to be a resin layer comprising a cured product of a photosensitive resin composition containing:

(A) a polyfunctional (meth)acrylate;
(B) a polyfunctional urethane-modified (meth)acrylate; and
(C) a photopolymerization initiator. The components (A) to (C) may preferably be contained as chief components. Incidentally, in the present specification, an acrylate and a methacrylate are generically termed "(meth)acrylate".

The resin composition used in the optical element of the present invention may preferably have a viscosity before polymerization curing, of 50,000 cP or lower at room temperature. If the resin composition has a viscosity higher than 50,000 cP, it may have a poor operability and also may cause an increase in defectives due to inclusion of bubbles.

In general, resins change in refractive index before and after curing. Hence, in order to attain the desired refractive index after curing, the composition of the resin must be determined taking account of the changes in refractive index before and after curing. Accordingly, in respect of the above resin composition, changes in refractive index before and after curing have been studied in detail. As the result, it has been ascertained that the refractive index after curing comes to 1.55 or more when the refractive index before curing is 1.52 or more. Thus, the photosensitive resin composition in the present invention may preferably have a refractive index before curing of 1.52 or more.

In order for the resin composition to have the refractive index of 1.52 or more before curing, the component-(A) polyfunctional (meth)acrylate alone may be made to have a refractive index of 1.53 or more. Such a polyfunctional (meth)acrylate having a refractive index of 1.53 or more may preferably be selected from those having two or more benzene ring structures in one molecule.

As specific examples of the polyfunctional (meth)acrylate, it may include bifunctional (meth)acrylates such as di(meth)acrylate of 2,2-dimethyl-3-hydroxypropyl-2,2-dimethyl-3-propionate, ethylene glycol di(meth)acrylate, polyethylene glycol di(meth)acrylate, propylene glycol di(meth)acrylate, polypropylene glycol di(meth)acrylate, 1,4-butanediol di(meth)acrylate, 1,6-hexanediol di(meth)acrylate, neopentyl glycol di(meth)acrylate, di(meth)acrylate of an ethylene oxide addition product of bisphenol A, di(meth)acrylate of a propylene oxide addition product of bisphenol A, di(meth)acrylate of 2,2'-di(hydroxypropoxyphenyl)propane, di(meth)acrylate of tricyclodecane dimethylol, and a di(meth)acrylic acid addition product of 2,2'-di(glyciuyloxyphenyl)propane.

It may also include as compounds preferred as the component (A) in the present invention, e.g., trimethylolpropane tri(meth)acrylate, pentaerythritol tri(meth)acrylate, pentaerythrythol tetra(meth)acrylate, dipentaerythritol hexa(meth)acrylate, tetramethylolmethane tetra(meth)acrylate, tri(meth)acrylate of tris (hydroxyethyl)isocyanurate, tri(meth)acrylate of tris(2-hydroxyethyl)isocyanurate, tri(meth)acrylate of trimellitic acid, triallyltrimellitic acid, and triallyl isocyanurate.

As a result of extensive studies, the present inventors have discovered that a di(meth)acrylate represented by the following Formula (1) is particularly preferred as the component (A). Of the di(meth)acrylate represented by Formula (1), one having a molecular weight of 1,000 or less is more preferred because of its large refractive index.

The polyfunctional (meth)acrylate having benzene rings tends to have a large molecular weight. The one having too large a molecular weight may make the resin have too high a viscosity. On the other hand, the resin may have a low viscosity when the structure $(R^3—O)_n$ and/or $(R^4—O)_m$ other than the benzene rings in Formula (1) is/are large, but may also have a low refractive index. Accordingly, polyfunctional (meth)acrylates having various molecular weights have been compared and studied. As the result, it has been ascertained that it is suitable for the molecular weight to be 1,000 or less.

The component (A) may preferably be in a content of from 10 to 95% of the resin as weight percentage. If it is less than 10%, the resin may have a refractive index less than 1.55. If it is more than 95%, the resin may have a low environmental resistance.

The component (B) is a polyfunctional urethane-modified (meth)acrylate. This is a compound composed chiefly of a diisocyanate, a polyol and a hydroxy(meth)acrylate. Also, a polyester diol may optionally be used. The component (B) may be constituted of one kind of polyfunctional urethane-modified (meth)acrylate, or may be constituted of two kinds or more.

The component-(B) polyfunctional urethane-modified (meth)acrylate commonly has a low refractive index. In order for the resin to have the refractive index of 1.52 or more after mixing, the polyfunctional urethane-modified (meth)acrylate alone may preferably be made to have a wherein $R^1$ and $R^2$ are each a hydrogen atom or a methyl group, $R^3$ and $R^4$ are each a hydrocarbon group having 2 to 4 carbon atoms, and m and n are each an integer of 1 or more.

The component (A) may be constituted of one kind of polyfunctional (meth)acrylate, or may be constituted of two kinds or more. This component (A) has the function to enhance the refractive index of the resin used in the optical element of the present invention. Accordingly, the component (A) may preferably have a refractive index before curing of 1.53 or more.

refractive index of 1.48 or more. If the component (B) has a refractive index less than 1.48, the resin layer may have a low refractive index.

As a result of extensive studies, the present inventors have discovered that a compound represented by any of the following Formulas (2) to (4) is particularly preferred as the component (B).

wherein $R^5$ and $R^6$ are each a hydrogen atom or a methyl group, $R^7$ and $R^8$ are each a hydrocarbon group having 1 to 10 carbon atoms, $R^9$ is an isocyanate residual group, $R^{10}$ is a polyol residual group or a polyester residual group, and p is o0 or an integer of 10 or less.

(3)

wherein $R^{11}$ is a hydrocarbon group having 1 to 10 carbon atoms, and $R^{12}$ is (hereinafter "$R^{13}$ group")

or (hereinafter "$R^{16}$ group")

wherein $R^{14}$, $R^{15}$ and $R^{18}$ are each a hydrogen atom or a methyl group, and $R^{17}$ is a hydrocarbon group having 1 to 10 carbon atoms.

(4)

wherein $R^{19}$ is a hydrocarbon group having 1 to 10 carbon atoms, and $R^{20}$ and $R^{21}$ are each (hereinafter "R 22 group")

or (hereinafter "$R_{23}$ group")

wherein $R^{24}$, $R^{25}$ and $R^{26}$ are each a hydrogen atom or a methyl group, and $R^{27}$ is a hydrocarbon group having 1 to 10 carbon atoms.

$R^9$ in Formula (2) may preferably contain an aliphatic ring or an aromatic ring, taking account of the refractive index of the component (B). Also, as in Formula (3), the (meth) acrylate may be bonded to the isocyanate cyclic trimer. The (meth)acrylate in Formulas (3) and (4) may be monofunctional or may be polyfunctional.

The component (B) may preferably be in a content of from 5 to 80% of the resin as weight percentage. If it is less than 5%, the resin may have a low environmental resistance. If it is more than 80%, the resin may have so high a viscosity as to result in a poor operability.

As the component-(C) photopolymerization initiator, any known compound may be used. For example, substances of an acetophenone type, a benzoin type, a benzophenone type, a thioxane type and an acylphosphine oxide type may be used. In present invention, as the photopolymerization initiator, any one selected from these may be used, or two or more of these may be used in combination. If necessary, a photopolymerization initiator auxiliary agent may further be added.

The component (C) may preferably be in an amount of from 0.1 to 5% of the resin as weight percentage. As long as it is within this range, the resin can be cured at an appropriate curing rate without any lowering of its properties.

In addition to the components (A) to (C) described above, the photosensitive resin composition used in the present invention may preferably further contain at least one additive selected from:

(D) a monofunctional (meth)acrylate;

(E) a release agent;

(F) a silicon compound; and (G) an epoxy (meth)acrylate.

The component-(D) monofunctional (meth)acrylate commonly has a higher fluidity than other components, and hence it flows through the interior of the resin layer also in the course of polymerization reaction caused by irradiation, and has the effect of keeping any internal stress from being produced. Concurrently therewith, it has the effect of lessening unreacted functional groups and making the gel percentage higher to improve the weatherability of the optical element. Hence, the addition of the component (D) enables the mold shape to be transferred in a higher precision to provide an optical element having a surface with higher precision.

As specific examples of the component (D), it may include methyl (meth)acrylate, ethyl (meth)acrylate, cyclohexyl (meth)acrylate, dicyclopentyl (meth)acrylate, isobornyl (meth)acrylate, bornyl (meth)acrylate, phenyl (meth)acrylate, halogen-substituted phenyl (meth)acrylate, benzyl (meth)acrylate, α-naphthyl (meth)acrylate, β-naphthyl (meth)acrylate, and dicyclopentyloxyethyl acrylate. Any one of these substances may used alone, or two or more selected from these may be used in combination.

The component (D) may preferably be in an amount of from 0.1 to 30% of the resin as weight percentage. As long as it is within this range, the fluidity of resin at the time of molding can be ensured without any lowering of the properties of the resin.

The component-(E) release agent is used in order to weaken the release-resisting force acting when a resin cured product is released from the mold after the resin has been cured upon irradiation. The addition of the component (E) enables the resin to be prevented from sticking to the mold to remain even after a large number of optical elements have been formed, and a much higher figure tolerance can be achieved.

As this component (E), any known materials may be used. As specific examples, it may include neutralizable or non-neutralizable phosphate alcohols. As to the component (E), too, any one of them may be used alone or two or more of them may be used in combination.

The component (F) is a silicon compound. It has the effect of smoothing the surface of the cured product to improve the mar resistance or keep any defects from occurring. Hence, the addition of the component (F) in a very small quantity makes the smoothness of resin surface higher and brings about an improvement in mar resistance, so that an optical element having a much higher durability can be obtained. In the present invention, a wide range of substances are usable as the silicon compound. As specific examples of the compound usable as the component (F), it may include tetramethoxysilane, tetraethoxysilane, γ-methacryloxypropyltrimethoxysilane, γ-glycidyloxypropyltrimethoxysilane, and (meth)acrylates having an Si—O linkage at some part of the backbone chain.

The component (F) may preferably be added in an amount of from 0.001% by weight to 10% by weight. Its addition in an amount less than 0.001% by weight can not be effective. Its addition in an amount more than 10% by weight not only may provide no desired refractive index, but also may cause faulty external appearance such as milky-white.

The component-(G) epoxy (meth)acrylate provide the resin appropriately with an adhesion attributable to the hydroxyl groups formed upon cleavage of epoxy groups to afford the effect of preventing the resin from coming off from the mold during the irradiation. Hence, the addition of the component-(G) epoxy (meth)acrylate in an appropriate quantity can prevent the resin from coming off from the mold during UV irradiation. This is effective especially when the PAG lens having a large extent of aspherical surface is formed.

There are no particular limitations on the epoxy (meth) acrylate to be used. For example, usable are addition reaction products of an epoxy resin such as phenolic novolak epoxy resin, bisphenol-A epoxy resin, glycerol polyglycidyl ether or 1-6 hexane diglycidyl ether with a monomer having a (meth)acrylic acid or carboxylic acid group.

The component (G) may preferably be added in an amount of from 1% by weight to 30% by weight. Its addition in an amount less than 1% by weight can not be effective. Also, its addition in an amount more than 30% by weight may provide so strong adhesion between the mold and the resin as to make mold release difficult.

3. Exposure Step:

In the present invention, the photosensitive resin composition capable of curing upon exposure is used to form the resin layer. In order to improve the weatherability by curing the resin to a higher degree of cure, the energy of light with which the resin is irradiated at the time of curing must be made higher. In conventional cases, the degree of cure is enhanced with an increase in the level of irradiation, but resulting in a decrease in light transmittance. The present inventors have examined the relationship between the light transmittance of a resin and the wavelength of the light applied to cure the resin. As the result, they have discovered that irradiation by light with a wavelength of 300 nm or more can make the light transmittance higher than that in conventional cases even when the level of irradiation is made higher than that in conventional cases to cure the resin to a higher degree.

Accordingly, the present invention provides a process for producing a resin-cemented optical element, the process comprising:
   a first exposure step of irradiating a photosensitive resin composition held between the surface of a base member and a mold, by light with a wavelength of 300 nm or more to cure the composition to form a resin layer; and
   a mold release step of mold-releasing the resin layer;
   in this order.

The irradiation by such light may also be performed at one time, or may be done twice or more. In order to cure the resin to a higher degree, it is effective to irradiate the resin-cemented optical element additionally after mold release. In conventional cases, however, such an additional irradiation has been considered not preferable because an increase in irradiation level may make the degree of cure higher but results in a lowering of light transmittance. However, the present inventors have discovered that the additional irradiation after mold release may also be made by light with a wavelength of 300 nm or more and this enables the resin to be further cured to a higher degree than the degree before additional irradiation and at the same time enables the resin to be more improved in light transmittance than that before such irradiation.

Accordingly, the present invention provides a process for producing a resin-cemented optical element, the process comprising:
   a first exposure step of irradiating a photosensitive resin composition held between the surface of a base member and a mold, to cure the composition to form a resin layer;
   a mold release step of mold-releasing the resin layer; and
   a second exposure step of irradiating the resin layer by light with a wavelength of 300 nm or more; in this order.

To perform this additional irradiation, a method may be employed in which, e.g., a plurality of resin-cemented optical elements having been released from the mold are put into an exposure unit having a light source which radiates light with a wavelength of 300 nm or more, and irradiate the resin-cemented optical elements additionally at one time.

The mechanism is unclear as to the phenomenon that the degree of cure of the resin is improved and the light transmittance of the resin is also improved by setting to 300 nm or more the wavelength of the light to which the resin is exposed. It, however, can be presumed that, probably the light with a wavelength of 300 nm or more accelerates the curing reaction of the resin, without destroying the chemical structure of the resin to cause absorption, and hence the resin is cured to a higher degree and at the same time a reaction initiator contained in the resin is thereby consumed, so that the absorption of light that is inherent in the reaction initiator may less occur.

As the light source used to irradiate the photosensitive resin composition by light (usually, ultraviolet light is preferred) to effect exposure to cure the composition, a metal halide lamp, a high-pressure mercury lamp, a low-pressure mercury lamp, a black light, a chemical lamp or the like may be used. Of these, the metal halide lamp, the high-pressure mercury lamp and the chemical lamp are preferred because they can emit light with a wavelength of 300 nm or more in a good efficiency. It is also preferable to shield the light with a wavelength of less than 300 nm by the use of a commercially available filter or the like.

There are no particular limitations on the atmosphere of exposure. The exposure may be performed in air, in an atmosphere of nitrogen, in an atmosphere of an inert gas or in vacuum, depending on the properties of the photosensitive resin composition to be used.

At the time of the exposure, the resin composition may also be heated in order to accelerate its curing. When heated, it may preferably be heated at a temperature of from 40° C. to 130° C. At a temperature lower than 40° C., any sufficient effect is not obtainable in some cases. At a temperature higher than 130° C., the resin may become too soft to retain the desired shape of the resin layer.

In the present invention, when the irradiation is performed a plurality of times, the same light source may be used, or a different light source may be used each time. Also, its atmosphere may be so changed such that the first irradiation is performed in air and the second and subsequent irradiation in an atmosphere of nitrogen.

The base member surface may also previously be subjected to coupling treatment with a coupling agent so that the resin layer can be made to adhere strongly to the base member.

4. Heating Step:

In the present invention, the step of heating the resin composition or resin cured product may preferably be provided in the steps for producing the resin-cemented optical element. This enables more improvement of the light transmittance of the resin than that in conventional cases, and also enables the resin to be cured to a higher degree to improve the weatherability.

This heating may be carried out at any time, and may preferably be carried out after the resin composition has been photo-cured and the cured product has been released from the mold together with the base member. For example, a plurality of resin-cemented optical elements having been released from the mold may be put into an oven in one lot and heated at one time, thus the heating can be carried out in a good productivity and at a low cost.

Accordingly, the present invention provides;

(1) a process for producing a resin-cemented optical element, the process comprising:
an exposure step of irradiating a photosensitive resin composition held between the surface of a base member and a mold, to cure the composition to form a resin layer;
a mold release step of mold-releasing the resin layer; and
a heating step of heating the resin layer;

in this order; and (2) a process for producing a resin-cemented optical element, the process comprising:
an exposure step of irradiating a photosensitive resin composition held between the surface of a base member and a mold, with heating to cure the composition to form a resin layer; and
a mold release step of mold-releasing the resin layer; in this order.

Incidentally, the mechanism is unclear as to the phenomenon that the light transmittance and degree of cure of the resin are improved by the heating. It, however, can be presumed that, the heating accelerates the post-curing (a phenomenon that the curing of photosensitive resin proceeds gradually also after exposure) of the resin to enhance the degree of cure, and also, since in the heating step the curing reaction proceeds, the chemical structure of the resin is not destroyed by light and on the contrary any slight absorption sources caused in the resin layer at the time of curing are remedied on.

In this heating step, the heating temperature may preferably be from 40° C. to 130° C. At a temperature lower than 40° C., any sufficient effect is not obtainable in some cases. At a temperature higher than 130° C., the resin may become too soft to retain the desired shape of the resin layer.

Between the mold release step and the heating step, the second exposure step described previously may also be provided in order to accelerate the curing reaction further and improve the inner transmittance.

5. Others:

The resin-cemented optical element of the present invention may include, e.g., lenses, prisms and diffraction gratings. The present invention can well be effective especially when applied to aspheric lenses, and is especially suited for still cameras such as an analog still camera and a digital still camera, and video cameras, or interchangeable lenses for these, which are used in various environments and whose optical systems are especially required to be made compact and light-weight and to have good optical characteristics.

As materials of the base member in the present invention, any of glass, plastic and so forth may appropriately be selected as long as they do not deform or change in properties as a result of the heating in the heating step.

BEST MODES FOR PRACTICING THE INVENTION

The present invention is specifically described below by giving Examples. The present invention is by no means limited to these Examples.

In the following Examples, the resin layer is irradiated by light (ultraviolet light) on the side of the base member, and a metal mold made of a metal is used as the mold. In the present invention, however, the mold is by no means limited to it. For example, a mold comprised of a transparent material such as glass may also be used as the mold. When such a transparent material is used as the mold, the resin composition can be cured by irradiation on the side of the mold, and hence the base member need not be transparent. On the other hand, when an opaque material such as a metal is used as the mold as in the following Examples, a light-transmissive material must be used as the base member because it is necessary to irradiate the photosensitive resin composition on the side of the base member. Accordingly, in the following Examples, a glass lens is used as the base member.

In the following Examples, the value at a wavelength of 380 nm was used as the inner transmittance, where the order of fluctuations of the inner transmittance value did not reverse.

EXAMPLE 1

In this Example, first a resin composition (photosensitive resin composition) was prepared which was obtained by mixing the following components (A) to (C). Next, this composition was coated on a glass base, followed by curing to form a resin layer to produce a PAG lens.

Component (A): 80 parts of di(meth)acrylate of Formula (1) wherein m+n is 3.

Component (B): 19.5 parts of urethane-modified di(meth) acrylate of Formula (2).

Component (C): 0.5 part of an acetophenone type photopolymerization initiator.

The refractive index of this resin composition before curing was 1.535, and the viscosity thereof at room temperature was 3,500 cP.

This resin composition was poured into a base mold made of glass, and then irradiated by light of a high-pressure mercury lamp for 2 minutes to form a rectangular colorless transparent block of 2 mm thick. Concerning this block, its refractive index after curing was measured to find that it was 1.556. Its durometer hardness was also measured to find that it was HDD 78.

Its inner transmittance in a 100 μm thick area was further calculated using data of spectral transmittance of a molded product different in thickness to reveal that the transmittance was 97% for the light with a wavelength of 380 nm.

Next, the glass transition temperature Tg was examined on a molded product of 2 mL thick. The Tg was determined as the point of inflection of a curve showing dimensional changes caused by heating, using TMA (thermomechanical analysis), a type of thermal analysis. As the result, the Tg was 97° C.

Next, using a molded product of 2 mm thick, the rate of hygroscopic dimensional change before and after moisture absorption was examined. More specifically, the initial dimension of the molded product was measured in an environment of 25° C./50% RH, and thereafter put into a thermo-hygrostat for 24 hours which was kept at 50° C./90% RH, to cause the molded product to absorb moisture. Thereafter, its dimensions were measured again in the environment of 25° C./50% RH to determine their change rate. As the result, the rate of hygroscopic dimensional change was 0.35%.

The gel percentage was determined in the following way: About 0.5 g of the resin cured product was dried in a desiccator for about a day, and thereafter the mass of the dried resin obtained was precisely measured. Next, this resin was immersed in 70° C. methyl ethyl ketone for 6 hours. Here, the methyl ethyl ketone was changed for new one at intervals of 2 hours. The resin having been immersed for 6 hours was heated at 100° C. for 2 hours, and then left in the desiccator for a day to make it dry. Thereafter, the mass of the resin thus dried was precisely measured. Here, where the mass of the initial resin was represented by c, and the mass after immersion in methyl ethyl ketone by d, the gel percentage was calculated to be 97% according to the expression: $(d/c) \times 100$ (%).

The rate of shrinkage on curing was calculated using measurements of specific gravity before and after curing. As the result, the rate of shrinkage on curing was 5.5%.

Figure 1:
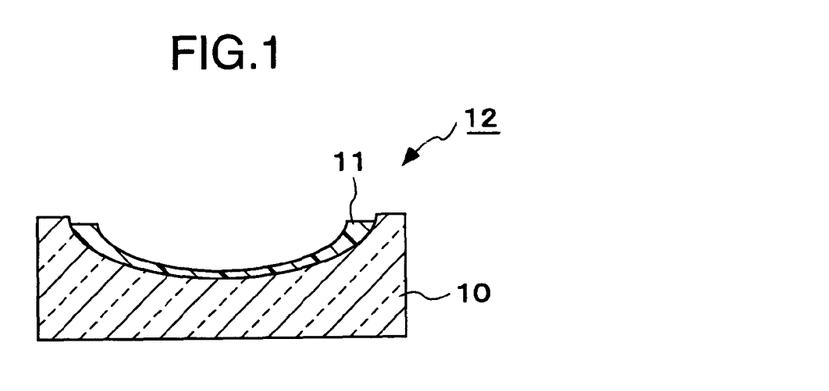
FIG. 1 is a schematic illustration of a PAG lens according to the present invention.
Figure 2:
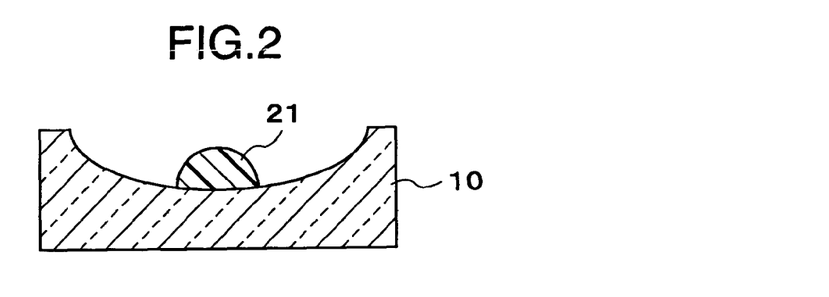
FIG. 2 is a schematic illustration of the step of feeding a resin composition in a PAG lens production process.
Figure 3:
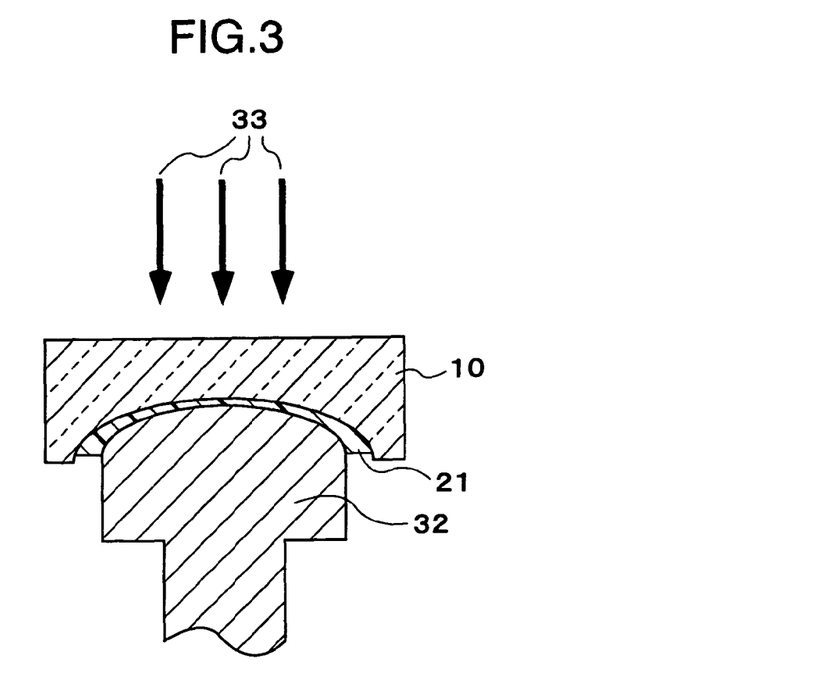
FIG. 3 is a schematic illustration of an exposure step in the PAG lens production process.

In this Example, a PAG lens was produced in the following way. First, as shown in FIG. 2, a resin composition 21 was dropped on the concave surface of a glass base member 10. As shown in FIG. 3, the glass base member 10 on which the resin composition was dropped was, with its upside down, pressed against a convex aspherical-surface metal mold 32 to press and spread the resin composition 21 into the desired shape. Thereafter, the resin composition was irradiated by ultraviolet rays 33 for 2 minutes by means of a high-pressure mercury lamp (not shown) to cure the resin composition 21. After the resin composition 21 was cured, the cured product was released from the mold to obtain a PAG lens 12 as shown in FIG. 1, comprising the glass base member 10 having on its surface a resin layer 11.

Here, the glass base member 10 used in this Example was 40 mm in diameter, and its side on which the resin was to be dropped was previously subjected to silane coupling treatment to improve the adhesion of glass to the resin layer 11.

The resin layer of the PAG lens 12 obtained in this Example has a greatly aspherical shape in a maximum thickness of 800 μm and a minimum thickness of 100 μm. Even though the resin layer was molded in such a greatly aspherical shape, the desired aspherical shape stood transferred exactly to the resin layer without any coming-off of the resin from the metal mold during the molding.

On the PAG lens thus obtained, a anti-reflection coat (not shown) was formed by vacuum deposition. As the result, a PAG lens having both good external appearance and good performance was producible without causing any difficulties such as cracking. A heat resistance test was made on the PAG lens having this anti-reflection coat. As the result, even though it was left in an environment of 70° C. for 24 hours, any change in external appearance was not seen at all.

A weatherability test was also made using a carbon fadometer. The change in transmittance at 380 nm after the weatherability test was 0.5% or less in terms of the inner transmittance in a 100 μm thick area.

This is value not problematic at all in practical use.

EXAMPLE 2

In this Example, a PAG lens was produced in the same manner as in Example 1 except that the urethane-modified hexa(meth)acrylate of Formula (3) was used as the component (B) of the resin composition.

Physical properties of the resin composition before curing and of the resin after curing which were measured in the same manner as in Example 1 are shown in Table 1.

TABLE 1

| | Example | | | | | | |
|---|---|---|---|---|---|---|---|
| | 1 | 2 | 3 | 4 | 5 | 6 | 7 |
| Before curing: | | | | | | | |
| Refractive index | 1.535 | 1.531 | 1.532 | 1.525 | 1.529 | 1.529 | 1.530 |
| Viscosity at room temperature (cP) | 3500 | 4500 | 2000 | 3000 | 3500 | 3500 | 3500 |
| After curing: | | | | | | | |
| Refractive | 1.556 | 1.552 | 1.556 | 1.551 | 1.555 | 1.555 | 1.556 |

TABLE 1-continued

| | Example | | | | | | |
|---|---|---|---|---|---|---|---|
| | 1 | 2 | 3 | 4 | 5 | 6 | 7 |
| index | | | | | | | |
| Durometer hardness | HDD78 | HDD82 | HDD80 | HDD80 | HDD79 | HDD79 | HDD80 |
| Transmittance (100 μm thickness) | 97 | 98 | 98 | 98 | 98 | 98 | 98 |
| Glass transition temperature (° C.) | 97 | 101 | 100 | 99 | 100 | 100 | 100 |
| Hygroscopic dimensional change (%) | 0.35 | 0.30 | 0.35 | 0.30 | 0.35 | 0.35 | 0.35 |
| Gel percentage (%) | 97 | 98 | 98 | 98 | 98 | 98 | 98 |
| Shrinkage on curing (%) | 5.5 | 6.0 | 6.0 | 5.0 | 6.0 | 6.0 | 6.0 |

Next, a PAG lens was produced using an aspherical-surface metal mold in the same manner as in Example 1. As the result, the desired aspherical shape stood transferred exactly to the resin layer without any coming-off of the resin from the mold during the molding.

On the surface of the resin layer of the PAG lens thus obtained, a anti-reflection coat was further formed by vacuum deposition. As the result, a PAG lens having both good external appearance and good performance was producible without causing any difficulties such as cracking in the anti-reflection coat. A heat resistance test was made on the PAG lens having this anti-reflection coat. As the result, even though it was left in an environment or 70° C. For 24 hours, any change in external appearance was not seen at all.

The same good results as those in Example 1 were also obtained in the weatherability test made using a carbon fadometer.

EXAMPLE 3

In this Example, a PAG lens was produced in the same manner as in Example 1 except that the urethane-modified tetra(meth)acrylate of Formula (4) was used as the component (B) of the resin composition. As the result, the desired aspherical shape had exactly been transferred to the resin layer without any coming-off of the resin from the mold during the molding. Physical properties of the resin composition before curing and of the resin after curing which were measured in the same manner as in Example 1 were as shown in Table 1.

On the surface of the resin layer thus obtained, a anti-reflection coat was further formed in the same manner as in Example 1. As the result, a PAG lens having both good external appearance and good performance was obtained, and the results of its heat resistance test were also as good as those in Example 1.

The same good results as those in Example 1 were also obtained in the weatherability test made using a carbon fadometer.

EXAMPLE 4

In this Example, a resin composition was prepared by mixing as the component (A) 80 parts of the di(meth)acrylate of Formula (1), as the component (B) 14.5 parts of the urethane-modified di(meth)acrylate of Formula (2), as the component (C) 0.5 part of an acetophenone type photopolymerization initiator and as the component (D) 5 parts of produced. As the result, the desired aspherical shape had exactly been transferred without any coming-off of the resin from the metal mold during the molding. Physical properties of the resin composition before curing and of the resin after curing which were measured in the same manner as in Example 1 were as shown in Table 1.

On the surface of the resin layer thus obtained, a anti-reflection coat was further formed in the same manner as in Example 1. As the result, a PAG lens having both good external appearance and good performance was obtained, and the results of its heat resistance test were also as good as those in Example 1.

The same good results as those in Example 1 were also obtained in the weatherability test made using a carbon fadometer.

EXAMPLE 5

In this Example, a photosensitive resin composition was prepared by mixing as the component (A) 80 parts of the di(meth)acrylate of Formula (1), as the component (B) 19 parts of the urethane-modified di(meth)acrylate of Formula (2), as the component (C) 0.5 part of an acetophenone type photopolymerization initiator and as the component (E) 0.5 part of a non-neutralizable phosphate alcohol. Using this composition, a PAG lens was produced. As the result, the desired aspherical shape had exactly been transferred without any coming-off of the resin from the metal mold during the molding.

In particular, when the resin of this Example was used, much better releasability than that in Examples 1 to 4 was achievable, and the resin did not adhere to the mold even when a large number of PAG lenses were continuously formed. As the result, the time taken for cleaning the mold was reduced to half or less, bringing about an improvement in production efficiency.

Physical properties of the resin composition before curing and of the resin after curing which were measured in the same manner as in Example 1 were as shown in Table 1. On the surface of the resin layer of the PAG lens thus obtained, a anti-reflection coat was further formed in the same manner as in Example 1. As the result, like Example 1, a PAG lens having both good external appearance and good performance was obtained, and the results of its heat resistance test were also as good as those in Example 1.

The same good results as those in Example 1 were also obtained in the weatherability test made using a carbon fadometer.

EXAMPLE 6

In this Example, a photosensitive resin composition was prepared by mixing as the component (A) 80 parts of the di(meth)acrylate of Formula (1), as the component (B) 19 parts of the urethane-modified di(meth)acrylate of Formula (2), as the component (C) 0.5 part of an acetophenone type photopolymerization initiator and as the component (F) 0.5 part of γ-methacryloxypropyltrimethoxysilane. Using this composition, a PAG lens was produced. As the result, the desired aspherical shape had exactly been transferred without any coming-off of the resin from the metal mold during the molding. As a result of microscopic observation of the resin surface of the PAG lens of this Example, the surface was found to be very smooth. Also, though in the PAG lenses of Examples 1 to 5 microscopic defects of few μm or less in diameter were slightly present at their surfaces, such defects were not seen at all in the PAG lens of this Example.

Physical properties of the resin composition before curing and of the resin after curing which were measured in the same manner as in Example 1 were as shown in Table 1.

On the surface of the resin layer thus obtained, a anti-reflection coat was further formed in the same manner as in Example 1. As the result, like Example 1, a PAG lens having both good external appearance and good performance was obtained, and the results of its heat resistance test were also as good as those in Example 1.

The same good results as those in Example 1 were also obtained in the weatherability test made using a carbon fadometer.

EXAMPLE 7

In this Example, a photosensitive resin composition was prepared by mixing as the component (A) 70 parts of the di(meth)acrylate of Formula (1), as the component (B) 19 parts of the urethane-modified di(meth)acrylate of Formula (2), as the component (C) 0.5 part of an acetophenone type photopolymerization initiator and as the component (G) 10.5 parts of bisphenol-A epoxyacrylate. Using this composition, a PAG lens was produced. As the result, the desired aspherical shape had exactly been transferred without any coming-off of the resin from the metal mold during the molding. Physical properties of the resin composition before curing and of the resin after curing which were measured in the same manner as in Example 1 were as shown in Table 1.

It was also tested to form fifty PAG lenses continuously by using an aspherical-surface metal mold having a difference of as large as 900 μm between the maximum resin thickness and the minimum resin thickness. As the result, any faulty molding did not occur at all. Then, the like test was made using the resins of Examples 1 to 6. As the result, the lenses produced using the resins of Examples 1 to 6 were on the level of no problem in practical use, but faulty molding that the resin came off from the mold during the irradiation by ultraviolet light occurred at a rate of one or two lenses in the fifty lenses for each Example. Thus, the resin of this Example was found to be especially superior.

On the surface of the resin layer thus obtained, a anti-reflection coat was further formed in the same manner as in Example 1. As the result, like Example 1, a PAG lens having both good external appearance and good performance was obtained, and the results of its heat resistance test were also as good as those in Example 1.

The same good results as those in Example 1 were also obtained in the weatherability test made using a carbon fadometer.

EXAMPLE 8

In this Example, a PAG lens was produced using the same photosensitive resin composition as that in Example 1 and using a glass lens of 40 mm in diameter as the base member.

More specifically, the same photosensitive resin composition 21 as that in Example 1 was dropped on the concave surface of a glass base member 10 subjected previously to silane coupling treatment to improve its adhesion to the resin. The glass base member 10 was, with its upside down, pressed against a convex aspherical-surface metal mold 32 to press and spread the resin composition 21 into the desired shape. Thereafter, the resin composition was irradiated by ultraviolet rays 33 by means of a high-pressure mercury lamp (not shown) to cure the resin composition 21, and the cured product was released from the mold 32 to obtain a PAG lens.

Figure 4:
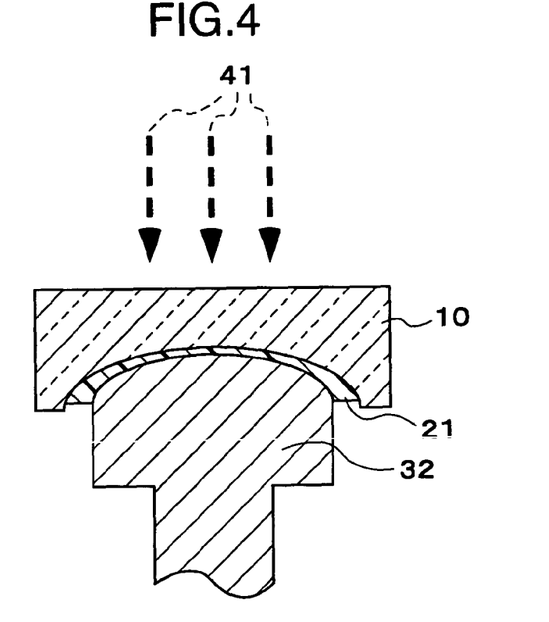
FIG. 4 is a schematic illustration of a heating step in the PAG lens production process.

At the time of the exposure, the irradiation light was measured with an illuminance meter manufactured by EYE-GRAPHICS CO LTD., having the sensitivity center at 365 nm, to find that the irradiation energy was 1,800 mJ/cm². Also, at the time of the exposure, as shown in FIG. 4, irradiation by infrared light 41 was performed through the glass base member 10 by means of an infrared lamp to heat the whole of the resin composition 21 and the mold 32 to 60° C.

The PAG lens thus obtained had the same good optical characteristics and weatherability as those in Example 1. Also, a plurality of PAG lenses having resin layers in different thickness were produced in the same manner as in this Example, and their spectral transmittances were measured. From the measurements obtained, the 100 μm thick inner transmittance was calculated to find that it was 98%. Also, the gel percentage of a resin cured product obtained by curing the resin composition in the same manner as in this Example was determined in the same manner as in Example 1 to find that it was 98%. The results are shown in Table 2.

As can be seen from these results, the introduction of the heating step into the resin-cemented optical element production steps can bring about an improvement in light transmittance of the resin layer and also an improvement in its gel percentage.

TABLE 2

| | Exaple 8 | Exaple 9 | Exaple 10 | Exaple 11 |
|---|---|---|---|---|
| Exposure step: The first time (before mold release): | | | | |
| Wavelength of irradiation light | not selected | not selected | 300 nm or more | not selected |
| Irradiation light energy (mJ/cm²) | 1800 | 1800 | 3000 | 1800 |
| Heating at the time of exposure | yes | no | no | no |
| The second time (after mold release): | | | | |
| Wavelength of irradiation light | undone | undone | undone | 300 nm or more |
| Irradiation light energy (mJ/cm²) | | | | 3000 |
| Heating at the time of exposure | | | | no |
| Heating step: | | | | |
| Heating after curing | no | yes | no | no |
| Inner transmittance (%): | 98 | 98 | 98 | 98 |
| Gel percentage (%): | 98 | 98 | 98 | 98 |

EXAMPLE 9

A PAG lens was produced in the same manner as in Example 8 except that in this Example the resin composition was not heated at the time of exposure and, after the cured product was released from the metal mold, it was put into an oven and heated at 70° C. for 24 hours.

The PAG lens thus obtained had the same good optical characteristics and weatherability as those in Example 8. Also, the inner transmittance and gel percentage determined in the same manner as in Example 8 in respect of the PAG lens and resin cured product in this Example were both 98%. The results are shown in Table 2.

EXAMPLE 10

Figure 5:
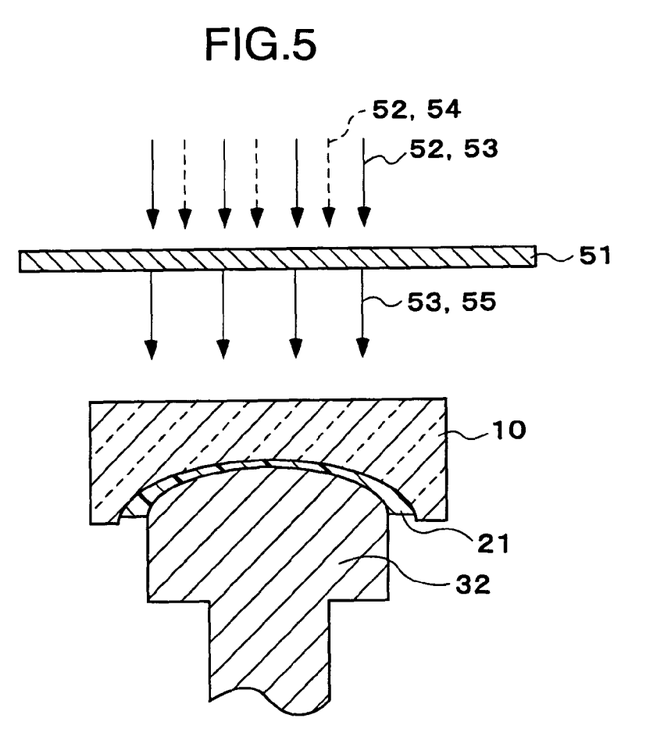
FIG. 5 is a schematic illustration of an exposure step in a PAG lens production process.

A PAG lens was produced in the same manner as in Example 8 except that in this Example the resin composition was not heated at the time of exposure and, at the time of the exposure, as shown in FIG. 5 an ultraviolet-transmitting filter "UV-32" (51), manufactured by HOYA Corporation, was fitted to a high-pressure mercury lamp (not shown) to shut out light 54 with a wavelength of less than 300 among light 52 from the light source so that only light 53 with a wavelength of 300 nm or more was applied as irradiation light 55. This irradiation light 55 was measured in the same manner as in Example 8 to find that the irradiation energy was 3,000 mJ/cm$^2$.

The PAG lens thus obtained had the same good optical characteristics and weatherability as those in Example 8. Also, the inner transmittance and gel percentage determined in the same manner as in Example 8 in respect of the PAG lens and resin cured product in this Example were both 98%. The results are shown in Table 2.

As can be seen from these results, the irradiation by light with a wavelength of 300 nm or more at the time of the curing of the resin layer can make the gel persentage of the resin layer higher and also can improve the light transmittance of the resin layer, even under the irradiation at a higher energy than that in conventional cases.

EXAMPLE 11

A PAG lens was produced in the same manner as in Example 8 except that in this Example the resin composition was not heated at the time of exposure and, after the cured product was released from the metal mold, it was put into a large-sized ultraviolet irradiation unit to further perform additional irradiation by means of a high-pressure mercury lamp to make second-time exposure treatment. At the time of this additional irradiation, an ultraviolet-transmitting filter UV-32, manufactured by HOYA Corporation, was fitted to the high-pressure mercury lamp so that only the light with a wavelength of 300 nm or more was applied. The irradiation light in this additional irradiation was measured with an illuminance meter manufactured by EYEGRAPNICS CO., LTD., having the sensitivity center at 365 nm, to find that the irradiation energy was 3,000 mJ/cm$^2$.

The PAG lens thus obtained had the same good optical characteristics and weatherability as those in Example 8. Also, the inner transmittance and gel percentage determined in the same manner as in Example 8 in respect of the PAG lens and resin cured product in this Example were both 98%. The results are shown in Table 2.

As can be seen from these results, the additional irradiation by light with a wavelength of 300 nm or more after the mold release can improve the light transmittance of the resin layer and also can make its gel percentage higher.

EXAMPLE 12

A PAG lens was produced in the same manner as in Example 11 except that in this Example, at the time of the first-time exposure, too, the ultraviolet-transmitting filter 51 was fitted to the high-pressure mercury lamp (not shown) in the same manner as in Example 10 to filter the irradiation light 55 so that only the light 53 with a wavelength of 300 nm or more was applied. This irradiation light was measured in the same manner as in Example 8 to find that the irradiation energy was 1,800 mJ/cm$^2$.

The PAG lens thus obtained had the same good optical characteristics and weatherability as those in Example 8. Also, the inner transmittance and gel percentage determined in the same manner as in Example 8 in respect of the PAG lens and resin cured product in this Example were both 98%. The results are shown in Table 3.

As can be seen from these results, the irradiation by light with a wavelength of 300 nm or more at the time of the curing of the resin layer and the additional irradiation by light with a wavelength of 300 nm or more after the mold release can improve the light transmittance of the resin layer and also can make its gel percentage higher.

TABLE 3

|  | Exaple 12 | Exaple 13 | Exaple 14 |
|---|---|---|---|
| Exposure step: | | | |
| The first time (before mold release): | | | |
| Wavelength of irradiation light | 300 nm or more | 300 nm or more | not selected |
| Irradiation light energy (mJ/cm$^2$) | 1800 | 1800 | 1800 |
| Heating at the time of exposure | no | no | no |
| The second time (after mold release): | | | |
| Wavelength of irradiation light | 300 nm or more | 300 nm or more | not selected |
| Irradiation light energy (mJ/cm$^2$) | 3000 | 3000 | 3000 |
| Heating at the time of exposure | no | no | no |
| Heating step: | | | |
| Heating after curing | no | yes | no |
| Inner transmittance (%): | 98 | 98 | 91 |
| Gel percentage (%): | 98 | 98 | 98 |

EXAMPLE 13

A PAG lens was produced in the same manner as in Example 12 except that in this Example, after the second-time exposure, the cured product was put into an oven and heated at 70° C. for 24 hours.

The PAG lens thus obtained had the same good optical characteristics and weatherability as those in Example 8. Also, the inner transmittance and gel percentage determined in the same manner as in Example 8 in respect of the PAG lens and resin cured product in this Example were both 98%. The results are shown in Table 3.

As can be seen from these results, the introduction of the heating step in the resin-cemented optical element production steps, the irradiation by light with a wavelength of 300 nm or more at the time of the curing of the resin layer and the additional irradiation by light with a wavelength of 300 nm or more after the mold release can improve the light transmittance of the resin layer and also can make its gel percentage higher.

EXAMPLE 14

A PAG lens was produced in the same manner as in Example 11 except that in this Example, after the second-time exposure, too, the wavelength of the irradiation light was not selected without fitting any ultraviolet-transmitting filter 51 to the high-pressure mercury lamp (not shown).

The PAG lens thus obtained had optical characteristics and weatherability of no problem in practical use like those in Example 8. Also, the inner transmittance and gel percentage determined in the same manner as in Example 8 in respect of the PAG lens and resin cured product in this Example were as shown in Table 3. In this Example, the gel percentage of the resin layer was 98%, which did not differ from the result in Example 11, but the inner transmittance was as low as 91% because the light for the additional irradiation made after mold release comprised the light with a wavelength of less than 300 nm.

POSSIBILITY OF INDUSTRIAL APPLICATION

According to the production process of the present invention, a resin-cemented optical element can be provided which has a resin layer having a high light transmittance and also has superior weatherability. Hence, the optical characteristics and reliability of the resin-cemented optical element can be improved. This enables resin-cemented optical elements to be mounted on one optical system in a larger number than ever.

In the optical element of present invention, the resin used in the resin layer also has a refractive index of 1.55 or more after curing, and hence the light by no means reflect greatly at the interface between the base member and the resin layer even when the base member has a high refractive index. Hence, an optical element having superior optical characteristics in respect of interference fringes can be obtained. Also, since the resin layer has a refractive index of 1.55 or more, the resin layer may be formed in a smaller thickness than a case in which resins having low refractive index are used as in conventional cases. Hence, according to the present invention, an optical element having better optical performance than that in conventional cases can be obtained with ease.

According to the present invention, since for example the transmittance has been improved, a light optical element can be obtained.

Thus, the application of the present invention to the PAG lens enables formation of sharp images which have been difficult for conventional lenses to form.

According to the present invention, since the resin layer can also be formed in a small thickness and the difference between the maximum layer thickness value and minimum layer thickness value can be made small, the moldability for resin-cemented optical elements can be improved. Hence, it can be made to cause less defectives, bringing about an improvement in production efficiency.

In the present invention, since the resin layer of the resin-cemented optical element can be formed in a smaller thickness than conventional ones and in addition thereto the resin having a low moisture absorption is used, the shape of the resin may less change with time even in an environment of high humidity, and hence an optical element can be obtained which can maintain high performance over a long period of time.

Since also a higher refractive index than conventional one can be achieved when the present invention is applied to PAG lenses, the number of lenses of a lens group consisting of a plurality of lenses in combination can be made smaller. This enables production of light-weight optical articles and achievement of cost reduction.

Moreover, since the resin used in the resin layer in the optical element of the present invention has a higher light transmittance than those conventionally used, and also has a small rate of hygroscopic dimensional change, a high gel percentage, a high glass transition temperature and a small rate of shrinkage on curing, the PAG lens having a large extent of aspherical surface which has ever been impossible to mold can be molded with ease.

Moreover, on account of the characteristics such as light transmittance, moisture absorption and rate of shrinkage on curing, an optical element can be produced which has superior optical performance even when the resin layer has a large thickness.

Furthermore, according to the present invention, an optical element also having superior environmental properties can be provided because of the use of the resin having glass transition temperature at the specific value.

In view of the foregoing, the optical element of the present invention is especially suited for still cameras such as an analog still camera and a digital still camera, an video cameras, or interchangeable lenses for these, which are used in various environments and whose optical systems are especially required to be made compact and light-weight and to have good optical characteristics.

What is claimed is:

1. An optical element comprising:
   a base member that is a glass lens; and
   a resin layer formed on the surface of the base member and comprising a cured product of a photosensitive resin composition having,
   a polyfunctional (meth)acrylate;
   a polyfunctional urethane-modified (meth)acrylate; and
   a photopolymerization initiator,
   wherein at least a part of said polyfunctional (meth) acrylate is represented by the following Formula (1):

wherein $R^1$ and $R^2$ are each a hydrogen atom or a methyl group, $R^3$ and $R^4$ are each a hydrocarbon group having 2 to 4 carbon atoms, and m and n are each an integer of 1 or more.

2. The optical element according to claim 1, wherein said polyfunctional (meth)acrylate has a refractive index before polymerization curing of 1.53 or more.

3. The optical element according to claim 1, wherein said polyfunctional (meth)acrylate has a molecular weight before polymerization curing of 1,000 or less.

4. The optical element according to claim 1, wherein said polyfunctional urethane modified (meth)acrylate has a refractive index before polymerization curing of 1.48 or more.

5. The optical element according to claim 1, wherein said polyfunctional urethane modified (meth)acrylate contains at least one of compounds represented by any of the following Formulas (2) to (4):

(2)

wherein $R^5$ and $R^6$ are each a hydrogen atom or a methyl group, $R^7$ and $R^8$ are each a hydrocarbon group having 1 to 10 carbon atoms, $R^9$ is an isocyanate residual group, $R^{10}$ is a polyol residual group or a polyester residual group, and p is 0 or an integer of 10 or less or wherein $R^{14}$, $R^{15}$ and $R^{18}$ are each a hydrogen atom or a methyl group, and $R^{17}$ is a hydrocarbon group having 1 to 10 carbon atoms;

(3)

(4)

wherein $R^{19}$ is a hydrocarbon group having 1 to 10 carbon atoms, and $R^{20}$ and $R^{21}$ are each wherein $R^{11}$ is a hydrocarbon group having 1 to 10 carbon atoms, and $R^{12}$ is wherein $R^{24}$, $R^{25}$ and $R^{26}$ are each a hydrogen atom or a methyl group, and $R^{27}$ is a hydrocarbon group having 1 to 10 carbon atoms.

\* \* \* \* \*

UNITED STATES PATENT AND TRADEMARK OFFICE
CERTIFICATE OF CORRECTION

| | | |
|---|---|---|
| PATENT NO. | : 7,070,862 B1 | |
| APPLICATION NO. | : 10/031602 | |
| DATED | : July 4, 2006 | |
| INVENTOR(S) | : Akiko Miyakawa et al. | |

It is certified that error appears in the above-identified patent and that said Letters Patent is hereby corrected as shown below:

Column 24, Line 34, change "having," to --having--

Signed and Sealed this

Fifteenth Day of May, 2007

JON W. DUDAS
*Director of the United States Patent and Trademark Office*